United States Patent [19]

Ito

[11] Patent Number: 4,873,431

[45] Date of Patent: Oct. 10, 1989

[54] RECORDING APPARATUS WITH OPTICAL FIBER CABLE INTERCONNECTING MICROCOMPUTERS

[75] Inventor: Masazumi Ito, Osaka, Japan

[73] Assignee: Minolta Camera Kabushiki Kaisha, Osaka, Japan

[21] Appl. No.: 231,095

[22] Filed: Aug. 11, 1988

[30] Foreign Application Priority Data

Aug. 12, 1987 [JP] Japan ............................. 62-202195
Aug. 17, 1987 [JP] Japan ............................. 62-204474
Sep. 16, 1987 [JP] Japan ............................. 62-233233

[51] Int. Cl.⁴ .................................................. H01J 5/16
[52] U.S. Cl. .................................... 250/227; 350/96.16; 355/204; 455/612; 364/132; 364/900
[58] Field of Search ................... 250/227; 350/96.16; 355/14 C; 455/612; 364/200, 900 MS File, 132

[56] References Cited

U.S. PATENT DOCUMENTS 4,144,550 3/1979 Donohue et al. ............... 355/14 C
4,161,650 7/1979 Caouette et al. ............... 350/96.16
4,276,656 6/1981 Petryk, Jr. ....................... 350/96.16

FOREIGN PATENT DOCUMENTS 61-126339 5/1986 Japan.

Primary Examiner—Edward P. Westin
Assistant Examiner—Eric F. Chatmon
Attorney, Agent, or Firm—Price, Gess & Ubell

[57] ABSTRACT

A control system for controlling a recording apparatus having a plurality of microcomputers, each microcomputer being formed in a single package. Each package includes an optical interface having a light-emitting device and a light-receiving device, an optical fiber cable connector attached to the package of the microcomputer, and an internal light transmission line for connecting the optical fiber cable connector to the optical interface inside the microcomputer package. Optical fiber cables for data communication are connected to the respective optical fiber cable connectors of the plurality of the microcomputers. In the control system, data vulnerable to electric noises are input through the optical interface.

11 Claims, 7 Drawing Sheets

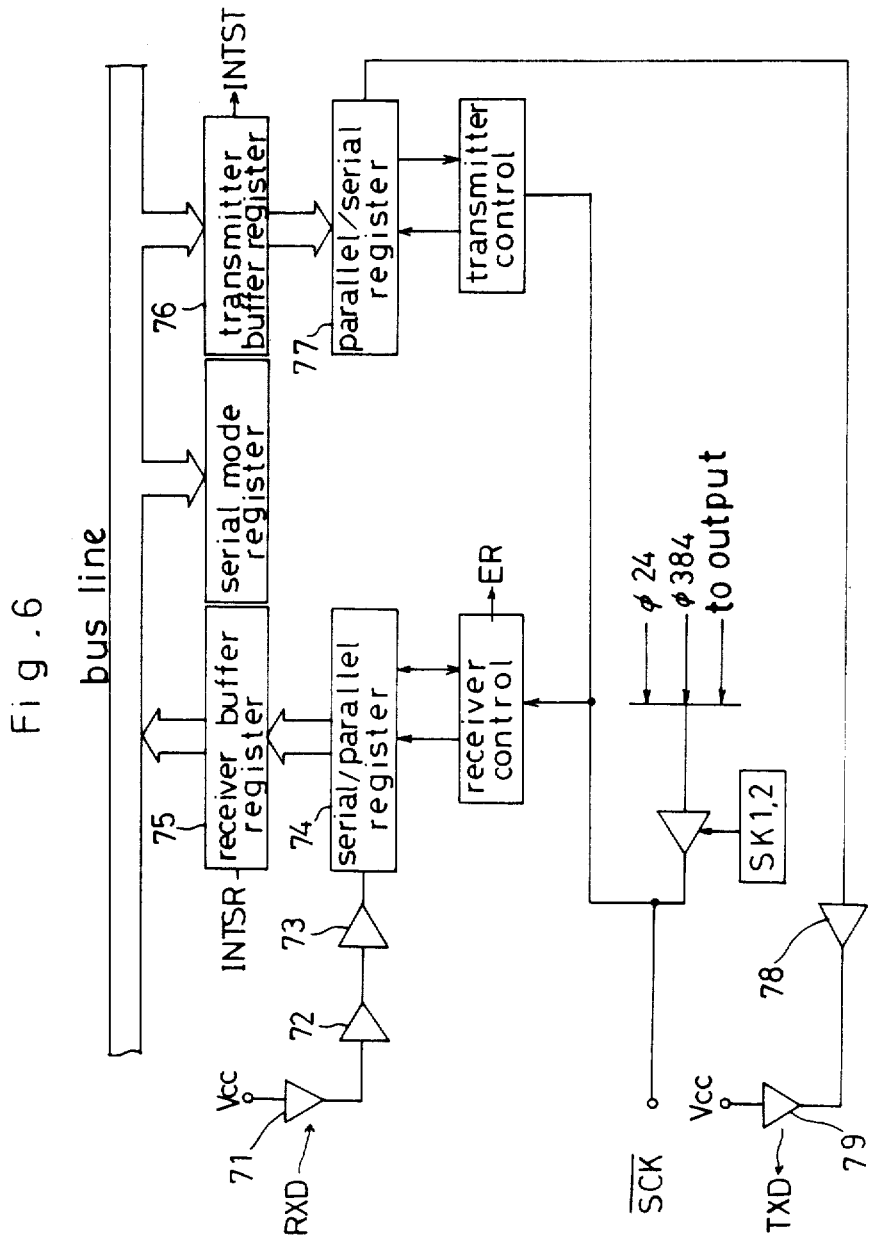

RECORDING APPARATUS WITH OPTICAL FIBER CABLE INTERCONNECTING MICROCOMPUTERS

BACKGROUND OF THE INVENTION

(1) Field of Invention

The present invention relates to a microcomputer system for communicating data or signals via an optical fiber cable, and more particularly to a microcomputer system for use in controlling an electrophotographic copier having a number of noise-generating sources.

(2) Description of the Prior Art

An electrophotographic copier utilizing an electrophotographic processing as an example of the recording apparatus generally includes a plurality of microcomputers for effecting a multi-microcomputer system control, wherein each microcomputer controls such operations as scanning, electrophotographic processing or the like with the microcomputers communicating control data with each other.

The above-noted type of recording apparatus incorporates therein a number of sources tending to generate various electric noises such as those from high-voltage power sources represented by chargers, static electricity generated in association with copy sheet movements or with toner (conductive material) movements. For this reason, such apparatus needs to be provided in its electric circuits, harnesses or the like with various precautionary measures against the electric noises.

With a view to the above situation, the prior art has suggested use of an optical fiber cable as the data communication line in an attempt to combat the noise problem.

When an optical fiber cable is utilized for data communication between microcomputers, it has been a common practice to solder data-communicating terminals of the microcomputer to a printed circuit board and to connect these soldered terminals via a printed pattern to terminals, which are also soldered to the printed circuit board, of an optical interface device interfacing the microcomputer with the optical fiber cable. That is to say, at the data output side, an electric signal generated from a serial data output terminal of the microcomputer travels through the electric circuit on the printed circuit board to reach the optical fiber interface device, where the electric signal is converted into optical data with a light emitting diode being energized by a driver, and then the data are transferred via the fiber cable to another microcomputer. Similarly, at the data input side, the optical data is converted through a photodiode, amplifier and comparator into electric data to be input to a serial data input terminal of this microcomputer.

With the above-described prior-art system utilizing the optical fiber cable as a noise-combatting measure; however, the signal is temporarily converted into an electric signal to be input to the microcomputer via the printed pattern and the photocopler both of which are exposed to the ambient conditions. Therefore, there remains the problem of the vulnerability of the exposed parts to the electric noises.

SUMMARY OF THE INVENTION

With a view to the above-described state of the art, the primary object of the present invention is to provide an electrophotographic recording apparatus which is highly resistant against electric noises.

In order to accomplish the above-noted object, a control system for controlling a recording apparatus related to the present invention comprises: a plurality of microcomputers, each microcomputer being formed in a single package. Each package includes interface means for interfacing data having an electric interface and an optical interface formed integrally with the electric interface, the optical interface including a light-emitting device and a light-receiving device, an optical fiber cable connector attached to the package of said microcomputer, and an internal light transmission line for connecting the optical fiber cable connector to the optical interface inside the microcomputer package. Optical fiber cable means for data communication are connected to the respective optical fiber cable connectors of the plurality of said microcomputers.

According to the above-described construction, in a recording apparatus incorporating a number of noise-generating sources, e.g. the high-voltage power source for charging the photoconductive drum or the static electricity generated in association with the copy sheet or toner movements, each of the plurality of microcomputers together with elements constituting the apparatus control system incorporates therein the optical interface mechanism thereby enabling the intermicrocomputer data communication to be directly effected by means of the optical signal. As the result, the apparatus control operation may be carried out without being affected by the various electric noises. The recording apparatus having this control system does not need the aforementioned noise-combatting measures required of the prior art apparatuses and will have the advantages of simple circuit construction and reduced manufacturing costs.

Further, in the above electrophotographic recording apparatus, in the case where the microcomputers per se may be disposed at places unaffected by the noises and the data or signal communication lines between the microcomputers may be installed also at such places, the above-described optical-interface-built-in microcomputer and optical-fiber data communication design may not be needed in particular. On the other hand, in the case of a reset signal which is generated from a reset circuit for initializing the microcomputers, a more reliable noise-shield design is needed. For, the reset signal comprises a one-pulse-like signal which may be easily affected even by a single noise to inadvertently reset the entire control system of the apparatus. For this reason, various alternative system designs with such a noise-shield measure adapted particularly for the reset signal are conceivable using conventional microcomputers and optical fibers in various combinations.

With view to the above situation, a control system for controlling a recording apparatus related to the present invention comprises: a plurality of microcomputers each having a reset terminal; a reset circuit for generating a reset signal; a light-emitting circuit having a light-emitting device connected to a signal output terminal of the reset circuit; light-receiving circuits each having a light-receiving device connected to the reset terminal of each of the microcomputers; and optical fiber cable means interconnecting between the light-emitting device and the light-receiving devices; whereby the reset signal is input to the reset terminals of the microcomputers without being affected by external electric noises.

With the above-described system, the reset signal generated as an electric signal from the reset circuit is converted through the light-emitting circuit into an optical signal which is transmitted via the optical fiber cable without being affected by the electric external noises. And, this transmitted optical signal is re-converted through the light-receiving circuit into an electric signal to be input to the microcomputer for controlling the recording apparatus. Consequently, the reset signal may be transmitted to the controlling device, i.e. the microcomputer without being significantly affected by the external noises generated in the vicinity of the signal-transmission line. Therefore, even if the reset signal is transmitted through a long line, such inadvertent or improper resetting of the controlling device due to external noises may be advantageously avoided, whereby the recording apparatus may be reliably and properly controlled by the controlling device at any time.

Especially, if it is attempted to avoid irregularities in the reset timing and at the same time to reduce manufacturing costs by enabling a reset signal from a single reset circuit to reset a plurality of controlling devices at one time, the controlling devices tend to be disposed apart from one another thereby lengthening the signal transmission lines to be provided therebetween. In such case, the effect of the present invention will be appreciated more conspicuously.

BRIEF DESCRIPTION OF THE DRAWINGS

FIG. 6 shows a construction of a serial port of the microcomputer chip.

DESCRIPTION OF THE PREFERRED EMBODIMENTS

Preferred embodiments of the present invention will be particularly described next with reference to the accompanying drawings.

Figure 1:
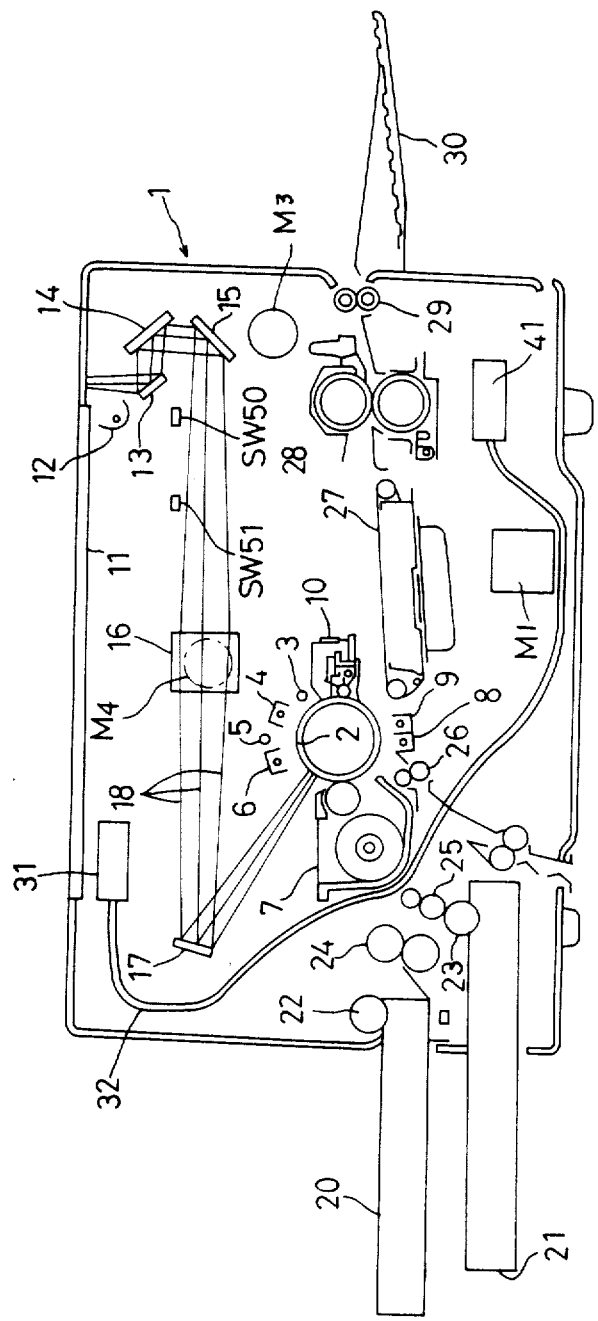
FIG. 1 is a cross section showing a construction of a copier as an example related to one preferred embodiment of the present invention.

FIG. 1 is a schematic section view showing an electrophotographic copier as one example of an electrophotographic recording apparatus related to the present invention. Centrally of a copier body 1, there is disposed a photoconductive drum 2 surrounded by a main eraser lamp 3, sub-corona charger 4, sub-eraser lamp 5, main corona charger 6, developing device 7, transfer charger 8, copy-sheet separator charger 9, blade-type cleaner 10 and so on in the mentioned order. The photoconductive drum 2 has its circumferential surface covered with a photoconductive material (e.g. selenium), and this photoconductive drum 2 undergoes, for each copy run, a light irradiation by the eraser lamp 3 and 5, a corona charging by passage of the corona chargers 4 and 6 and then an image exposure by an optical unit to be described next. Also, the photoconductive drum 2 is driven by a motor M1 which drives other components as well.

The above-noted optical unit, which is disposed downwardly of a document glass table 11 so as to scan an image of an original document placed thereon, includes a light source 12, first mirror 13, second mirror 14, third mirror 15, projector lens 16 and a fourth mirror 17. As indicated by lines 18, the document image is reflected by the respective mirrors 13, 14, 15 and 17 to reach the photoconductive drum 2. There is also provided a fixed-position switch SW50 for detecting whether or not the optical unit is placed at a predetermined position for scanning. An image magnification of this copier is set by moving the projector lens 16 by a motor M4 in a direction of the optical axis. The motor M3 drives the optical unit as described hereinbefore. More specifically, if an object magnification is n, the motor M3 moves the light source 12 and the first mirror 13 leftwards (in FIG. 1) at a speed: v/n relative to a circumferential speed V of the drum 2 (fixed regardless of the realsize or enlarged or reduced-size magnification). In synchronism therewith, the motor M3 moves the second mirror 13 and the third mirror 14 leftwards at a speed: v/2n, with which the document image is exposed in the form of slit from the fourth mirror 17 onto the photoconductive drum 2.

At the left side of the copier body 1, there are provided a pair of automatic sheet-feeder cassettes 20 and 21 attached respectively to an upper sheet feed opening and a lower sheet feed opening. Each of the copy sheets stacked in the automatic sheet-feeder cassette 20 and 21 is selectively fed by a respective feed roller 22 and 23 into the copier body 1 to be transported as being nipped between a respective transport roller pair 24 or 25 to a timing roller 26 which is in pressure-contact therewith. Thus the transported copy sheet is temporarily held in place at this position.

For a subsequent transfer operation, the copy sheet is moved by the timing roller 26 to be brought into contact with the circumferential face of the photoconductive drum 2 at an image transfer station, where the sheet has its face formed with a toner image by a corona charging of the transfer charger 8 and is separated from the photoconductive drum 2 by a corona charging of the separator charger 9 and also by its own stiffness. Next, this sheet is transported rightwards with a clockwise rotation of a transport belt 27 as being sucked thereto by an unillustrated air-suction means of the belt 27. Further, the sheet has its toner image fused and fixed while passing through a fusing device 28, and this image-formed sheet is exhausted via a sheet-exhaust roller pair 29 onto, e.g. a sheet tray 30 or an unillustrated sheet stacker disposed externally of the copier body 1.

Next, a control mechanism for the above operations of the electrophotographic copier will be particularly described.

A microcomputer (master microcomputer) 31 processes data input from an unillustrated control panel and transmits the processed data to another microcomputer (slave microcomputer) 41. These microcomputers 31 and 41 communicate data with each other via an optical fiber cable 32. The use of this optical fiber cable 32 advantageously eliminates the necessity of the prior-art counter-noise measures in the harness designing such as harnessing of the data communicating line independently or distantly of any high-voltage electric line or combining the same with an earth line in a twist-pair construction.

Figure 2:
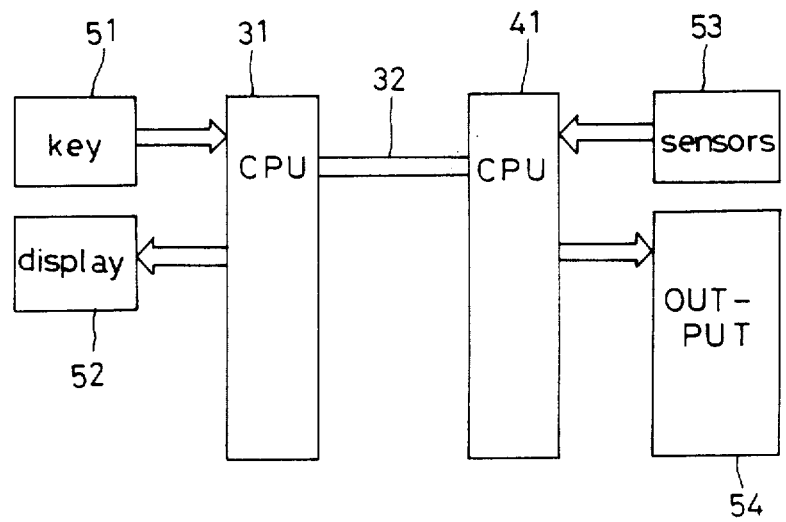
FIG. 2 is a block diagram of a control system for the copier.

FIG. 2 is a block diagram of the copier control system, in which the master microcomputer 31 processes signals input by an unillustrated group of keys 51 provided on the control panel thereby controlling a group of display units 52 and also transmitting via the optical fiber cable 32 data concerning the number of copy sheet, copy magnification, document exposure amount and so on.

On the other hand, the slave microcomputer 41 receives signals from a group of various sensors 53 and controls various output devices (e.g. motors, clutches, heaters) generically denoted by a reference numeral 54 based on the copy data transmitted from the master microcomputer 31.

Figure 3A:
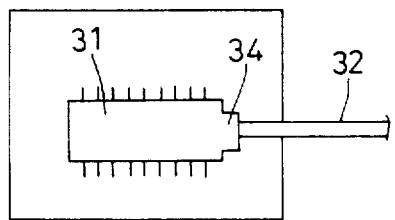
FIGS. 3(a), 3(b) and 3(c) are respectively a plane view, front view and a perspective view of a microcomputer related to the present invention.
Figure 3B:
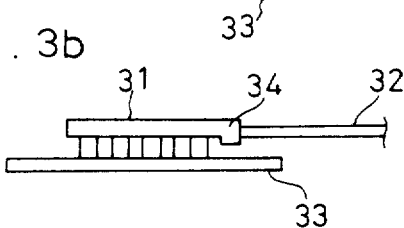
Figure 3C:
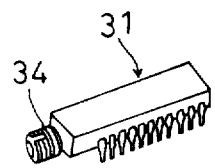

FIGS. 3(a), 3(b) and 3(c) are a plane view, front view and a perspective view respectively of the microcomputer 31 related to the preferred embodiment of the present invention.

This microcomputer 31 mounted on a printed circuit board 33 includes a connector 34 to which the optical fiber cable 32 is connected.

Figure 4:
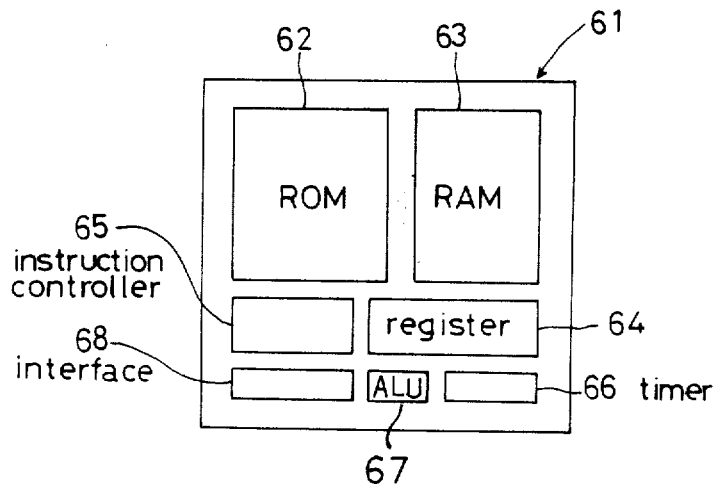
FIG. 4 shows a construction of a chip of the microcomputer.

FIG. 4 shows a construction of a chip 61 inside a package of the one-package microcomputer 31. Incidentally, what is referred here to as a one-package microcomputer is to be understood as an LSI incorporating a plurality of chips in a single package. The chip 61 includes a read-only-memory ROM 62, a RAM 63 capable of both reading and writing, register 64 for retaining data, an instruction controller 65 for decoding a command fetched from the memories to generate control signals, a timer 66 for timing the control system, an arithmetic logical unit, i.e. ALU 67 for carrying out calculation based on the control signals and an interface device 68 for interfacing the signals with external devices.

Figure 7:
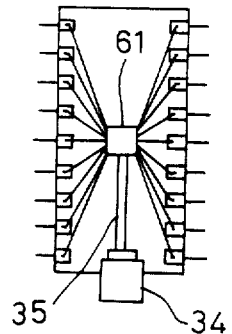
FIG. 7 is a plane view of the microcomputer.

In the microcomputer related to the present invention, the interface device 68 includes, apart from a conventional I/O port (see FIG. 5), a serial interface (optical interface) as shown in FIG. 6, with an optical fiber cable 35 being connected to this interface device 68 as shown in FIG. 7. Incidentally, the optical interface, i.e. the light emitting element, light receiving element and other elements associated therewith are formed integrally on a single package together with the other interface constituting elements by utilizing the art known as ASIC (Application Specified IC). The remaining construction of this interface device are the same as the prior art.

Figure 5:
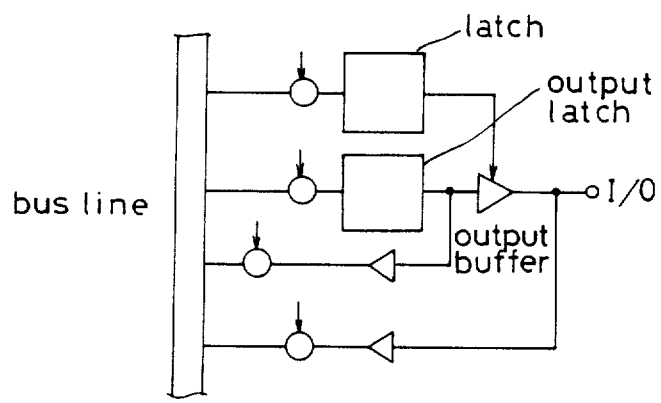
FIG. 5 shows a construction of an I/O port of the microcomputer chip.

FIG. 5 shows a circuit construction of the I/O port of the above interface device 68 of the chip 31. As shown in this FIG. 5, this circuit is constructed as a signal-latch circuit for switching the input-output mode of the I/O terminal for receiving from or generating signals to such copier components as the respective timing roller clutch, developing motor and the chargers.

FIG. 6 shows a circuit construction of the serial port (optical interface) of the interface device 68. In this circuit, what is referred to hereinafter as a serial mode register is to be understood as a register operable to designate an operation mode of the serial interface, and optical serial data transmitted to a data input port $R \times D$ is detected by a photodiode 71, amplified by an amplifier 72, converted into a digital electric signal by a comparator 73 and then transmitted to the serial/parallel register 74. Thereafter, the digital signal is converted through a serial/parallel converter 74 into parallel data to be transmitted via a receiver buffer register 75 to an internal bus. On the other hand, data to be transmitted is transmitted from the internal bus via a transmitter buffer register 76 to a parallel/serial converter 77 to be converted into serial data therethrough, which then energizes a light emitting diode 79 via a driver 78, whereby optical data is generated from a terminal $T \times D$. Incidentally, a terminal $\overline{SCK}$ is connected to an external clock. Reference marks $\phi$ 24 and $\phi$ 384 respectively denoting 1/24 and 1/384 clock rates of internal crystal oscillators. Also, reference marks SK1 and 2 denote control signals for selecting the external or internal clocks. These elements together constitute a clock circuit for generating clock signals.

FIG. 7 shows a package of the microcomputer 31 incorporating the chip 61 which is one of the characterizing features of the present invention. Respective terminals of this chip 61 are connected via bonding wires to bonding pads of respective reed terminals. Also, the $R \times D$ and $T \times D$ terminals for optical input and output of the interface 38 of the chip 61 are connected to a connector 34 via the optical fiber cable 35 which is branched into two lines in the vicinities of the terminals.

The other microcomputer 41, it is to be noted, has the same construction as the above microcomputer 31 and therefore will not be described for avoiding redundency.

Figure 8A:
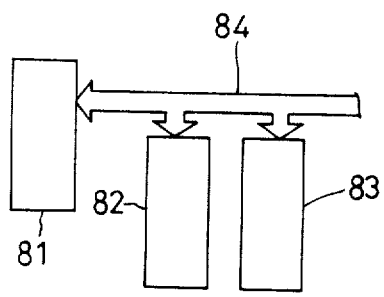
FIGS. 8(a) and 8(b) are respectively a block diagram and a plane view of another control system constituted by three microcomputers.
Figure 8B:
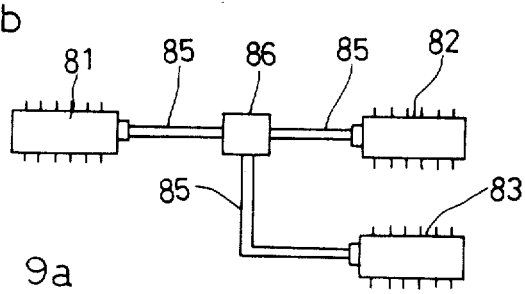

In the above description, the multi-microcomputer control system includes the two microcomputers 31 and 41. In place of this, it is also possible for the system to include more than three microcomputers. For instance, FIGS. 8(a) and 8(b) show such a multi-microcomputer system including three microcomputers 81, 82 and 83 interconnected via a common data bus 84, which data bus 84 includes an optical fiber cable 85 and an optical branching coupler (e.g. FDC-S301 manufactured by Fujikura Denshin) 86.

Figure 9A:
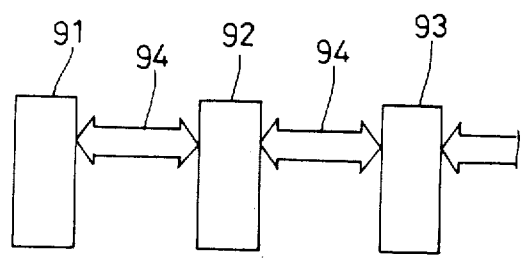
FIGS. 9(a) and 9(b) are respectively a block diagram and a plane view of a modified control system of the system of FIGS. 8(a) and 8(b)
Figure 9B:
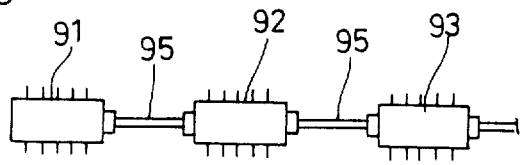

Further, FIGS. 9(a) and 9(b) show another data communication system in which a microcomputer 91 related to the present invention is connected in series to slave microcomputer 92 and 93 respectively incorporating two optical interface circuits with respective data bus 94 interconnecting the adjacent microcomputers being constituted by the optical fiber cables 95.

Similarly, it is also possible to construct a data communication system with more than four microcomputers.

Next, alternate embodiments of the present invention will be described.

In order to achieve the primary object of the present invention, i.e. to obtain an electrophotographic recording device highly resistant against electric noises, it is essential that the apparatus have reset-signal-processing circuits which are also highly resistant against electric noises. In the foregoing embodiment, as one effective measure to combat the disadvantageous influence of electric noises, the microcomputer incorporates therein the optical interface device in the form of a single-package microcomputer. Now, considering in particular the case where the communication-object data comprises a reset signal, apart from the above single-package microcomputer construction, other arrangements are also conceivable as will be described hereinafter. It is to be noted here that the following alternative system designs are possible only because the reset signal is more vulnerable to electric noises than those data dealt within the ordinary data communication system. As a first example of such a control system, it is possible to transmit the reset signal in the form of optical data through a light-receiving circuit to a microcomputer including only electric-signal-processing circuits, with the light-receiving circuit being attached to the microcomputer. Second, it is also possible to dispose the light-receiving circuit apart from the above microcomputer such that the reset signal is transmitted to the light-receiving circuit in the form of optical data through an optical fiber cable only at portions vulnerable to electric noises and then the data is converted through the light-receiving circuit into an electric signal to be transmitted to the microcomputer.

These arrangements will be particularly described next by way of alternate embodiments of the present invention.

Incidentally, in the following description of the alternate embodiments as well as in the previous embodiment, the control system of the present invention is embodied for use in an electrophotographic copier. Thus, it is to be noted that elements or components equivalent to those in the previous embodiment are denoted with similar reference marks.

This electrophotographic copier includes two microcomputers 131 and 141 in its control system, with the positional arrangement of these microcomputers being substantially the same as those of the microcomputers 31 and 41 used in the previous embodiment, but differ from the letter in construction solely in that the former have only electric circuits whereas the latter incorporate the optical interface mechanism. The microcomputer 131 is a host microcomputer adapted for setting various copying conditions or modes in response to operations of control keys in an unillustrated control panel disposed on an upper face of a copier body B and adapted also for displaying a set copying condition through a display section provided on the control panel. Further, this host microcomputer 131 is mounted on a printed circuit board 123 provided at an upper interior portion of the copier body B. The other microcomputer 141 is a slave microcomputer operable to control operations of various elements, e.g. for moving a scanning device S, rotating a photoconductive drum 6 and for transporting a copy sheet P. This slave microcomputer 141 is mounted, in the same manner as in the previous embodiment, on another printed circuit board 124 disposed at a lower interior portion of the copier body B.

The printed circuit board 123, which mounts the host microcomputer 131, mounts also a reset circuit 125 for generating a reset signal to the host and slave microcomputer 131 and 141. Further, this reset circuit 125 and the microcomputers 131 and 141 are interconnected with each other through a signal transmission line 126.

Figure 10:
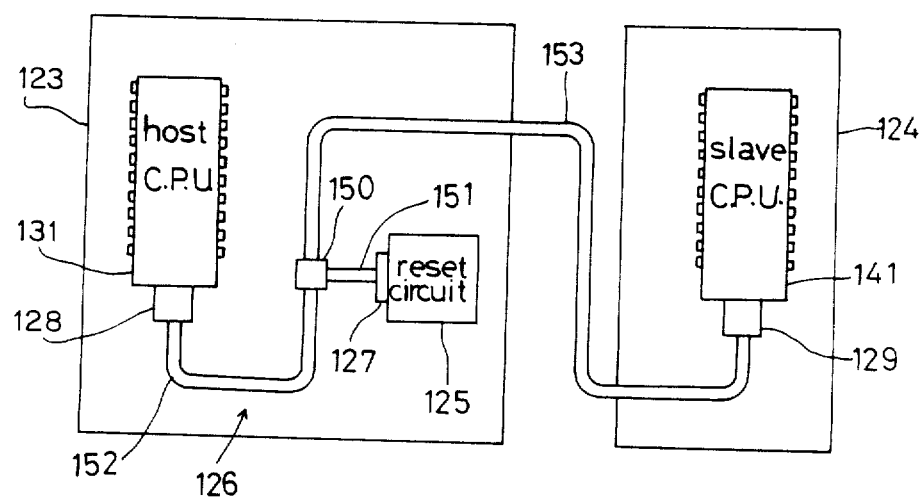
FIG. 10 is a schematic construction view of a control bus system including a reset circuit related to another embodiment of the present invention.

The above signal transmission line 126 includes, as shown in FIG. 10, an optical fiber cable 151 interconnecting a light-emitting circuit 127 attached to the reset circuit 125, light-receiving circuits 128 and 129 respectively attached to the microcomputers 131 and 141 and an optical branching device 150 and optical fiber cables 152 and 153 interconnecting the optical branching device 150 and the light-receiving circuits 128 and 129.

In operation, the reset signal generated as an electric signal in the reset circuit 125 is converted through the light-emitting circuit 127 into an optical signal. This optical signal is then transmitted through the optical fiber cable 151 and branched into two light components through the light branching device 150. The branched light components are respectively transmitted through the optical fiber cables 152 and 153 and converted into electric signals through the light-receiving circuits 128 and 129 to be input to the host and slave microcomputers 131 and 141.

Figure 11:
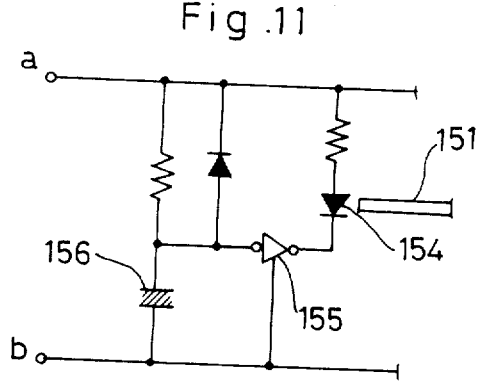
FIG. 11 is a circuit diagram of a light-emitting circuit of the embodiment of FIG. 10.

As shown in FIG. 11, the light-emitting circuit 127 attached to the reset circuit 125 includes a light emitting diode (LED) 154 facing one end of the optical fiber cable 151, a driver 155 for driving this LED 154 and so on. With an operation of an unillustrated power switch of the electrophotographic copier, a voltage is applied across a pair of terminals a and b disposed at the left side of the light-emitting circuit 127 and a capacitor 156 starts charging. Upon completion of this charging of the capacitor 156, the driver 155 is energized to cause the LED 154 to effect light emission and this emission light is transmitted as a reset signal through the optical fiber cable 151. That is to say, this copier is provided with the so-called 'power-on-reset' feature where, the power-ON provides the reset signal to both of the microcomputers 131 and 141.

Figure 12:
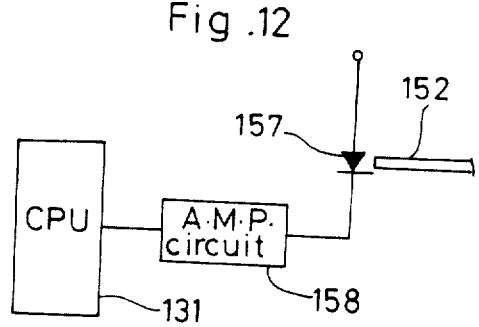
FIG. 12 is a circuit diagram of a light-receiving circuit of the embodiment of FIG. 10.

Further, as shown in FIG. 12, each of the light-receiving circuits 128 and 129 attached respectively to the host and slave microcomputers 131 and 141 includes a photodiode 157 facing an end of the optical fiber cable 152 and an amplifier circuit 158 having an amplifier and comparator connected to an output terminal of the photodiode 157. In operation, when the reset signal from the reset circuit 125 is input through the optical fiber cable 152 and 153, the photodiode 157 generates an optical current, which is then amplified through the amplifier circuit 158 to be input to the host and slave microcomputers 131 and 141.

In the above processes, since the reset signal is transmitted through the optical fiber cables 151, 152 and 153 between the reset circuit 125 and the host and slave microcomputers 131 and 141, the signal remains unaffected by external electric noises generated between the printed circuit boards 123 and 124. Moreover, since the reset signal is processed as the optical signal between the reset circuit 125 and the microcomputers 131 and 141, the signal is also free from influences of external electric noises generated on the printed circuit board patterns.

In the foregoing embodiments, the control system of the present invention is utilized for resetting two microcomputers. In place of this; however, it is also possible to adapt the system to reset a single microcomputer or more than three microcomputers.

Figure 13:
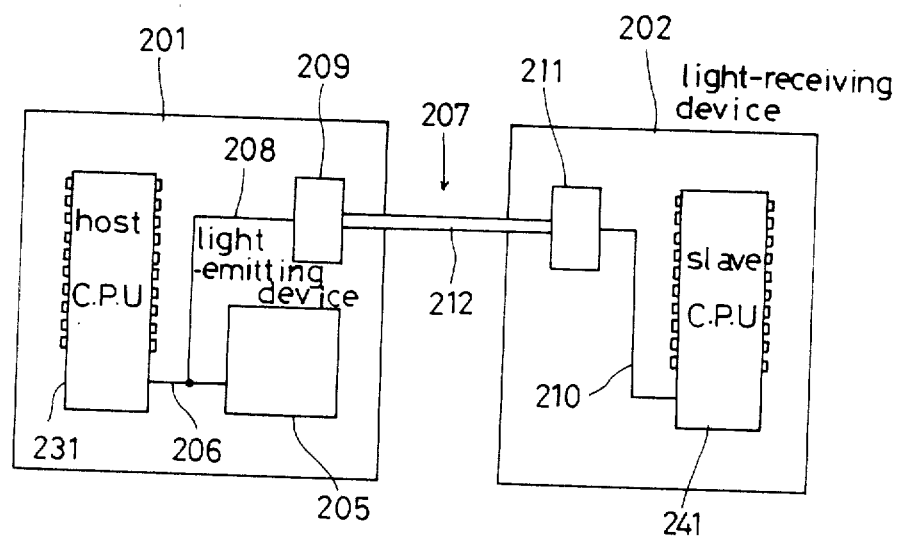
FIG. 13 is a schematic construction view of a control bus system including a reset circuit related to still another embodiment of the present invention.
Figure 14:
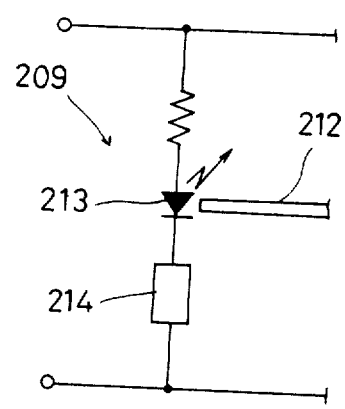
FIG. 14 is a circuit diagram of a light-emitting circuit of the embodiment of FIG. 13.

Next, a further embodiment of the present invention will be described. FIG. 13 shows an overall circuit construction and light-emitting and light-receiving circuits employed in this embodiment.

Similarly to the previous embodiment, the control system of this embodiment includes a host microcomputer 231, slave microcomputer 241 and a reset circuit 205. In this embodiment; however, the reset circuit 205 for generating a reset signal to the host and slave microcomputers 231 and 241 is mounted on a printed circuit board 201 mounting the host microcomputer 231, with the microcomputers 231 and 241 and the reset circuit 205 being connected via independent signal transmission lines 206 and 208.

Also, the host microcomputer 231 and the slave microcomputer 241 are connected to each other via an unillustrated signal line and data bus line.

The host microcomputer 231 and the slave microcomputer 241 are provided for effecting the same operations as those in the previous embodiment.

In this embodiment, the signal transmission line interconnecting between the reset circuit 205 and the host microcomputer 231 is constituted by an electric wire.

On the other hand, the signal transmission line 207 interconnecting between the reset circuit 205 and the slave microcomputer 241 is constituted, e.g. by the optical fiber cable 212 interconnecting the light-emitting circuit 209 connected via an electric wire 208 to the reset circuit 205, the light-receiving circuit 211 connected via an electric wire 210 to the slave microcomputer 241 and between the light-emitting circuit 209 and the light-receiving circuit 211. That is to say, unlike the previous embodiment, the optical fiber cable is utilized, in this embodiment, only at portions vulnerable to the influences of electric noises.

In operation, the reset signal generated as an electric signal from the reset circuit 205 is input as it is via the signal transmission line 206 to the host microcomputer 231 and then converted by the light-emitting circuit 209 into an optical signal to be transmitted through the optical fiber cable 212. Thereafter, the optical signal from the cable 212 is re-converted through the light-receiving circuit 211 into an electric signal to be input to the slave microcomputer 241.

As shown in FIG. 12, the light-receiving circuit 209 at the side of the reset circuit 205 includes an LED 213 opposing to one end of the optical fiber cable 212, a driver 214 for driving this LED 213 and so on. With input of an electric reset signal from the reset circuit 205, the driver 214 becomes energized to cause the LED 213 to emit light as an optical reset signal, which is then transmitted through and output from the optical fiber cable 212.

Incidentally, the other light-receiving circuit 211 at the side of the slave microcomputer 241 has the same construction as its equivalence employed in the previous embodiment and therefore will not be described.

Apart from the above-described embodiments, in forming a multi-microcomputer control system, it is also possible to use optical fiber cables in all of or some of signal transmission lines interconnecting the reset circuit 205, microcomputers and the light-emitting and light-receiving circuits depending on the particular necessity.

What is claimed is:

1. A control system for controlling a recording apparatus comprising:
    a plurality of microcomputers, each microcomputer being formed in a single package and including,
    interface means for interfacing data having an electric interface and an optical interface formed integrally with said electric interface, said optical interface including a light-emitting device and a light-receiving device,
    an optical fiber cable connector attached to the package of said microcomputer,
    an internal light transmission line for connecting said optical fiber cable connector to said optical interface inside said microcomputer package,
    optical fiber cable means for data communication connected to the respective optical fiber cable connectors of the plurality of said microcomputers.

2. A control system as defined in claim 1, wherein said optical interface includes a serial I/O port.

3. A control system as defined in claim 2, wherein a data signal is transmitted via at least one light-branching element to said optical fiber cable means to be input to optical fiber connectors of said microcomputers.

4. A control system for controlling a recording apparatus comprising:
    a plurality of microcomputers each having a reset terminal;
    a reset circuit for generating a reset signal;
    a light-emitting circuit having a light-emitting device connected to a signal output terminal of said reset circuit;
    light-receiving circuits each having a light-receiving device connected to the reset terminal of each of said microcomputers; and
    optical fiber cable means interconnecting between said light-emitting device and said light-receiving devices;
    whereby the reset signal is input to said reset terminals of the microcomputers without being affected by external electric noises.

5. A control system as defined in claim 4, wherein said reset circuit generates the reset signal in response to a power-ON of the control system.

6. A control system as defined in claim 4, wherein the reset signal is input to said reset terminal of said respective microcomputers via said light-receiving circuits respectively attached to said microcomputers.

7. A control system as defined in claim 4, wherein the reset signal is transmitted via at least one light-branching element to said optical fiber cable means to be input to said reset terminals of said microcomputers.

8. A control system as defined in claim 4, wherein at least one of said microcomputers and said reset circuit are electrically connected to each other and mounted together on a single board from which the reset signal is transmitted via said optical fiber cable means to another of said microcomputers disposed at a different portion of the recording apparatus.

9. A control system for controlling a recording apparatus comprising:
    a reset circuit for generating a reset signal;
    a light-emitting circuit having a light-emitting device connected to a signal output terminal of said reset circuit; and
    optical fiber cable means interconnecting between said light-emitting device and a plurality of microcomputers; each of said microcomputers including, interface means having an electric interface and an optical interface formed integrally with said electric interface, said optical interface including a light-receiving device and adapted for interfacing the reset signal, an optical fiber cable connector attached to the package of said microcomputer, and an internal light transmission line for connecting said optical fiber cable connector to said optical interface inside said microcomputer package.

10. In an electrophotographic copier having a plurality of functional operations for recording an image on copying paper with different operations being controlled by a plurality of microcomputers mounted in a copier housing, the improvement consisting of at least a pair of optical-electro interface means for converting electrical signals into optical signals and optical signals into electrical signals connected to at least two microcomputers and at least one optical communication fiber connected between the optical-electro interface means for transmitting data between the microcomputers in substantially a noise-free mode of operation.

11. The electrophotographic copier of claim 10 further including means for generating a reset signal connected to the optical communication fiber.

* * * * *